United States Patent
Ponton et al.

[11] Patent Number: 5,924,790
[45] Date of Patent: Jul. 20, 1999

[54] LAMP HOUSING, MOUNTING BRACKET AND ASSEMBLY THEREOF

[75] Inventors: Andrew J. Ponton; Mark A. Singleton, both of Seymour, Ind.

[73] Assignee: Valeo Sylvania L.L.C., Seymour, Ind.

[21] Appl. No.: 08/916,170

[22] Filed: Aug. 21, 1997

[51] Int. Cl.$^6$ .................................................. B60Q 1/00
[52] U.S. Cl. .......................................... 362/370; 362/365
[58] Field of Search ..................................... 362/370, 362, 362/365, 368, 549, 364, 248, 496, 226, 473, 474, 475, 476, 432; 248/223.41, 225.11, 222.13, 224.51, 224.61; D26/28, 36

[56] References Cited

U.S. PATENT DOCUMENTS

| | | | |
|---|---|---|---|
| D. 395,718 | 7/1998 | Ponton et al. | D26/28 |
| D. 399,015 | 9/1998 | Ponton et al. | D26/28 |
| 3,927,315 | 12/1975 | Werry | 248/223.41 |
| 5,035,389 | 7/1991 | Wang | 248/225.11 |
| 5,146,392 | 9/1992 | Kasboske | 362/362 |
| 5,332,183 | 7/1994 | Kgayama | 248/223.41 |
| 5,428,516 | 6/1995 | Harris | 362/226 |

*Primary Examiner*—Sandra O'Shea
*Assistant Examiner*—Todd Reed Hopper
*Attorney, Agent, or Firm*—William E. Meyer

[57] ABSTRACT

A lamp housing assembly is provided for mounting upon the facia of a motor vehicle. In one embodiment, the lamp housing assembly may be useful in housing and mounting a fog lamp to a motor vehicle. The lamp housing assembly includes a cup-shaped body having a key formed on the upper surface of the body. A mounting bracket is provided which includes a first portion having a keyway, which may be engaged with the key to attach the mounting bracket to the cup-shaped body. The mounting bracket also includes a second portion which extends beyond the cup-shaped body for attaching the mounting bracket to the facia.

23 Claims, 4 Drawing Sheets

LAMP HOUSING, MOUNTING BRACKET AND ASSEMBLY THEREOF

BACKGROUND OF THE INVENTION

1. Field of the Invention

The present invention relates to a lamp housing, a mounting bracket and an assembly thereof. The mounting bracket may be attached to the lamp housing to provide a lamp housing assembly which may be mounted to, for example, the facia of a motor vehicle. The present invention is particularly useful in providing a lamp housing assembly for use with a fog lamp to be attached to a motor vehicle.

2. Description of the Prior Art

The mounting of lamps to a structural support is desirable in many applications. For example, the mounting of lamps such as fog lamps to a motor vehicle is well known in the art. In such applications it is necessary to provide secure attachment of the lamp housing to the motor vehicle facia in such a manner as to prevent side sway of the lamp. It is also necessary to properly align the lamp housing relative to the motor vehicle during attachment thereto. In addition, the lamp housing should be readily removable from the motor vehicle to provide access as required. It is often desirable for aesthetic purposes that the lamp housing be inconspicuous, and lamps such as fog lamps are often fitted into a small facia hole. Heretofore, the foregoing objects have been accomplished by providing mounting studs in the form of elongated fasteners on the rear surface of the lamp housing and attaching the lamp housing to a rear surface of the facia using nuts. In applications where access to such rear mounting studs is difficult, if at all possible, an alternative mounting structure is required. In view of economies of scale in manufacturing lamp housings, it is desirable to fabricate a lamp housing which can be used in all applications regardless of whether the mounting studs are readily accessible, accessible with great difficulty or inaccessible.

SUMMARY OF THE INVENTION

It is an essential object of the present invention to provide an improved lamp housing assembly which may be mounted upon a support structure regardless of the accessibility of any mounting studs of the assembly. It is an object to achieve this goal and to provide for securely mounting the lamp housing assembly to hold the assembly in place and prevent any sway of the assembly. It is also an object to achieve this goal and to provide for the required alignment of the lamp housing assembly relative to the support structure to which it is to be attached. It is a further object to achieve this goal in such a manner that the lamp housing assembly is readily removable from the support structure to provide access as required. Yet another object is to achieve this goal and to provide a lamp housing assembly which may be fitted into a small opening in an inconspicuous manner. A further object is to effect one or more of the foregoing objects in a lamp housing assembly, particularly but without limitation for use as a fog lamp. Another object is to effect one or more of the foregoing objects by providing an improved lamp housing. It is another object to effect one or more of the foregoing objects by providing an improved mounting bracket. It is yet another object to provide a lamp housing assembly including a lamp housing and a mounting bracket readily attachable and detachable from the lamp housing.

This invention achieves these and other objects, in one aspect of the invention, by providing a lamp housing which comprises a cup-shaped body having a first surface and a key formed on the first surface. The key may comprise a first rail and a second rail spaced from the first rail. The first surface may include a front edge having thereon at least one locking lug.

A mounting bracket is also provided which comprises a first portion having a keyway which may be constructed and arranged to engage the key of the lamp housing for attachment of the mounting bracket to the cup-shaped body. The mounting bracket also comprises a second portion constructed and arranged to provide a structural mount. The mounting bracket may further include at least one flexible tongue which may be constructed and arranged to engage the locking lug of the cup-shaped body to lock the mounting bracket and cup-shaped body together.

A lamp housing assembly is also provided comprising the cup-shaped body and the mounting bracket.

BRIEF DESCRIPTION OF THE DRAWINGS

This invention may be clearly understood by reference to the attached drawings wherein like elements are designated with like reference numerals and in which.

DESCRIPTION OF THE PREFERRED EMBODIMENT

For a better understanding of the present invention, together with other and further objects, advantages and capabilities thereof, reference is made to the following disclosure and appended claims taken in conjunction with the above-described drawings.

Figure 1:
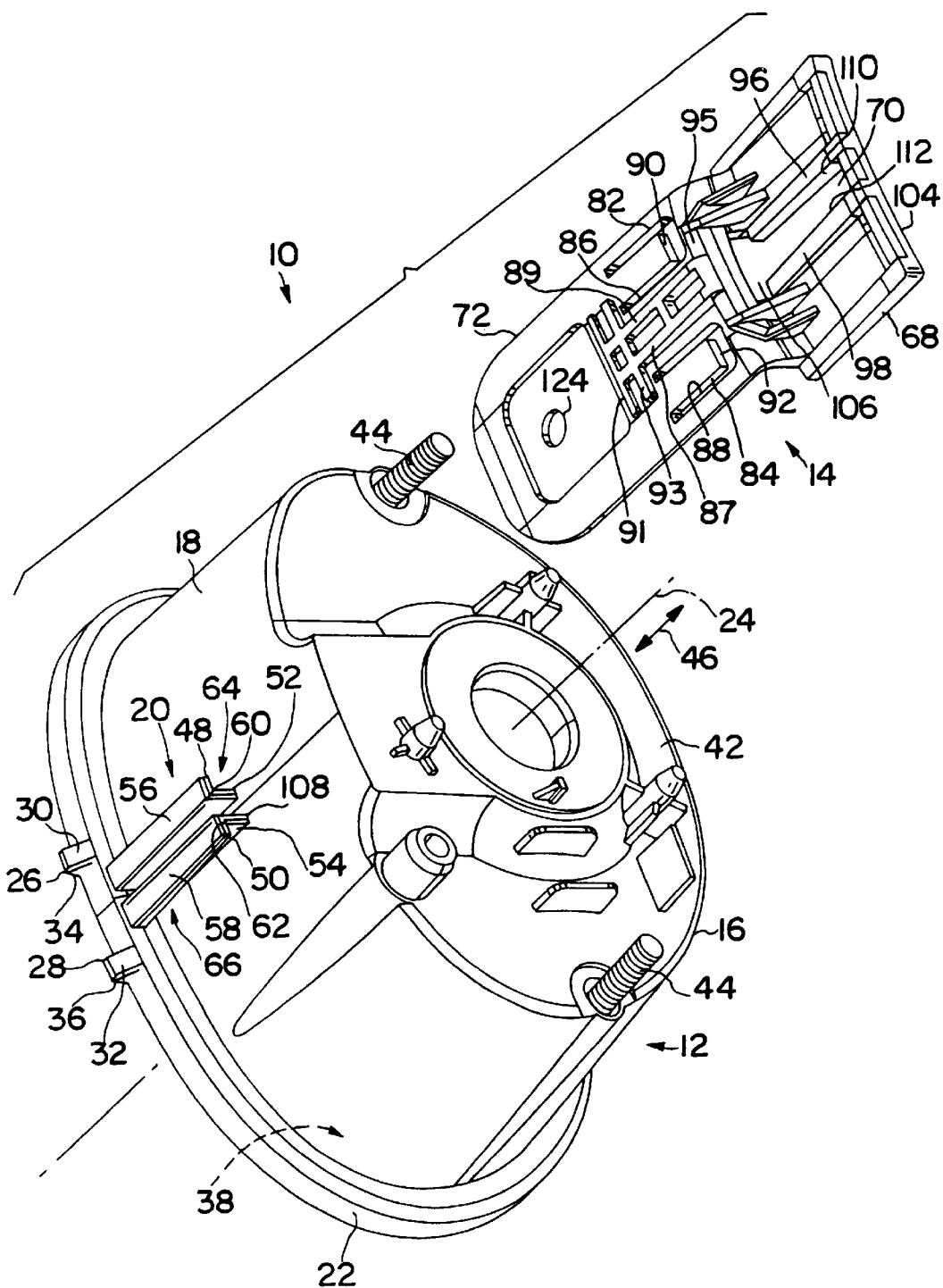
FIG. 1 is an exploded perspective view of one embodiment of the lamp housing assembly of the present invention.

The embodiment of this invention which is illustrated in FIG. 1 is particularly suited for achieving the objects of this invention. FIG. 1 depicts a lamp housing assembly 10 which includes a lamp housing 12 and a mounting bracket 14. Without limitation, the lamp housing assembly 10 is particularly useful in the fabrication of a fog lamp to be mounted to a motor vehicle. Lamp housing 12 comprises a cup-shaped body 16 having a surface 18 and a key 20 formed on surface 18. By way of example, the cup-shaped body 16 may be subtantially ellipsoidal as illustrated in FIG. 1. When the lamp housing assembly 10 is mounted upon a vehicle as described hereinafter, surface 18 will be an upper surface of the cup-shaped body 16.

In the embodiment depicted in FIG. 1 the surface 18 of the cup-shaped body 16 includes a front edge 22. Front edge 22 extends in a circumferential direction about a longitudinal axis 24 of the cup-shaped body 16. Front edge 22 may include at least one locking lug. In the embodiment illustrated in FIG. 1, front edge 22 includes two locking lugs 26, 28 spaced from each other. Locking lugs 26, 28 include respective camming surfaces 30, 32 and respective locking surfaces 34, 36. Each camming surface 30, 32 extends towards a respective locking surface 34, 36.

Figure 2:
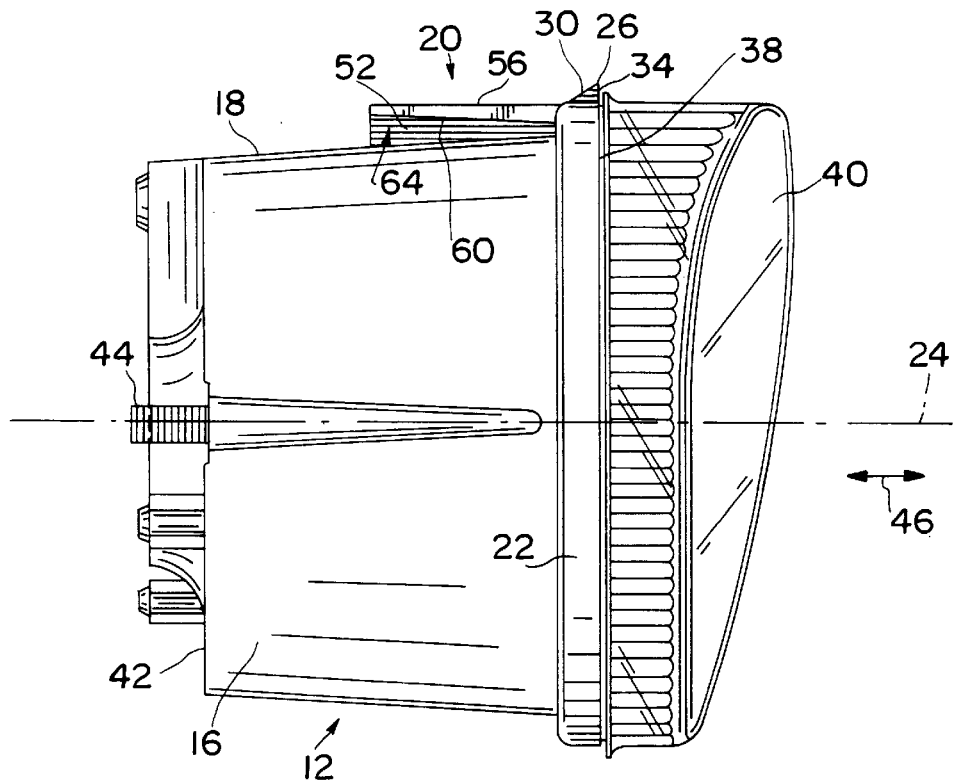
FIG. 2 is a side elevational view of one embodiment of a lamp housing of the present invention with an elongated fastener and a lens coupled thereto.

In the embodiment illustrated in FIG. 1, the cup-shaped body 16 includes a lens opening 38, covered by a lens 40 depicted only in FIG. 2, and another surface which may be, for example, an opposite rear surface 42. In the embodiment illustrated in FIG. 1, surface 18 extends between lens opening 38 and rear surface 42. The lamp housing of the present invention may also include at least one elongated fastener extending from the rear surface (a) in the direction of the longitudinal axis of the cup-shaped body and (b) away from the rear surface. For example, in the embodiment illustrated in FIG. 1, lamp housing 12 includes two elongated fasteners 44 each of which extend in the direction 46 of axis 24 and away from the rear surface 42.

In the embodiment illustrated in FIG. 1, the key 20 extending from the surface 18 of the cup-shaped body 16 comprises a rail 48 and a rail 50 spaced from rail 48. Rail 48 and rail 50 include respective legs 52, 54 which extend from surface 18, and respective legs 56, 58 which extend from respective distal edges 60, 62 of legs 52, 54. Legs 52, 54 are spaced from each other and extend in the direction 46 of axis 24. Legs 56, 58 extend away from each other. In the embodiment illustrated in FIG. 1, leg 52, leg 56 and surface 18 are constructed and arranged to form a wedge-shaped channel 64 which is tapered in the direction 46 of axis 24 towards the front edge 22 as can best be seen in FIG. 2. In a like manner, leg 54, leg 58 and surface 18 are constructed and arranged to form a similar wedge-shaped channel 66 which is also tapered in the direction 46 of axis 24 towards the front edge 22.

The mounting bracket of the present invention includes a first portion having a keyway and a second portion constructed and arranged to provide a structural mount. The keyway may be adapted to engage the key of the cup-shaped body of the lamp housing. For example, in the embodiment illustrated in FIGS. 1 and 3, the mounting bracket 14 includes a first portion 68 having a keyway 70 which is adapted as described herein to engage the key 20 which extends from the surface 18 of the cup-shaped body 16. Mounting bracket 14 also includes a second portion 72 which extends beyond the cup-shaped body 16 when the mounting bracket is attached to the cup-shaped body as described hereinafter. The second portion 72 is constructed and arranged to provide a structural mount as described hereinafter. Without limitation, in the embodiment illustrated in FIGS. 1 and 3, the first portion 68 and second portion 72 are integrally formed by a single piece of plastic material. The first portion 68 and the second portion 72 lie in two distinct planes and are joined by stepped portions 74, 76. Structural support of the first portion 68 relative to the second portion 72 is provided by bracing members 78, 80. Bracing members 78, and 80 substantially strengthen the coupling between portions 68 and 72.

The mounting bracket of the present invention includes at least one respective flexible tongue which may be used for engagement with each locking lug of the cup-shaped body of the lamp housing. For example, in the embodiment illustrated in FIGS. 1 and 3, the second portion 72 of the mounting bracket 14 includes a first flexible tongue 82 constructed and arranged for engagement with the locking lug 26 and a second flexible tongue 84 constructed and arranged for engagement with the locking lug 28. The first flexible tongue 82 and the second flexible tongue 84 comprise respective first lug engaging surfaces 86, 88 and second lug engaging surfaces 90, 92. The first flexible tongue 82 and the second flexible tongue 84 are spaced from each other and extend in the direction 46 and axis 24 towards the first portion 68. Positioned between, and parallel to tongues 82 and 84 are ribs 87, and 89. Extending perpendicular to axial ribs 87 and 89 near the bases of tongues 82 and 84 are cross ribs 91 and 93. Axial ribs 87 and 89 extend for the lengths of tongues 82 and 84, and cross ribs 91 and 93 extend to intersect the base regions of tongues 82 and 84. An additional cross rib 95 runs between stepped portions 74 and 76. Axial ribs 87 and 89 resist flexing of portion 72 in the region along the length of tongues 82 and 84. Similarly, cross ribs 91, 93 and 95 resist twisting of portion 72 in the region of tongues 82 and 84. By resisting flexing and twisting in the region of tongues 82 and 84, portion 72 resists dynamic actions that might lift tongues 82 and 84 from securely latching camming surfaces 30, 32 and locking surfaces 34, 36. The relative interior location of the ribs hides them form view, letting the visual edges be reduced in thickness.

Figure 3:
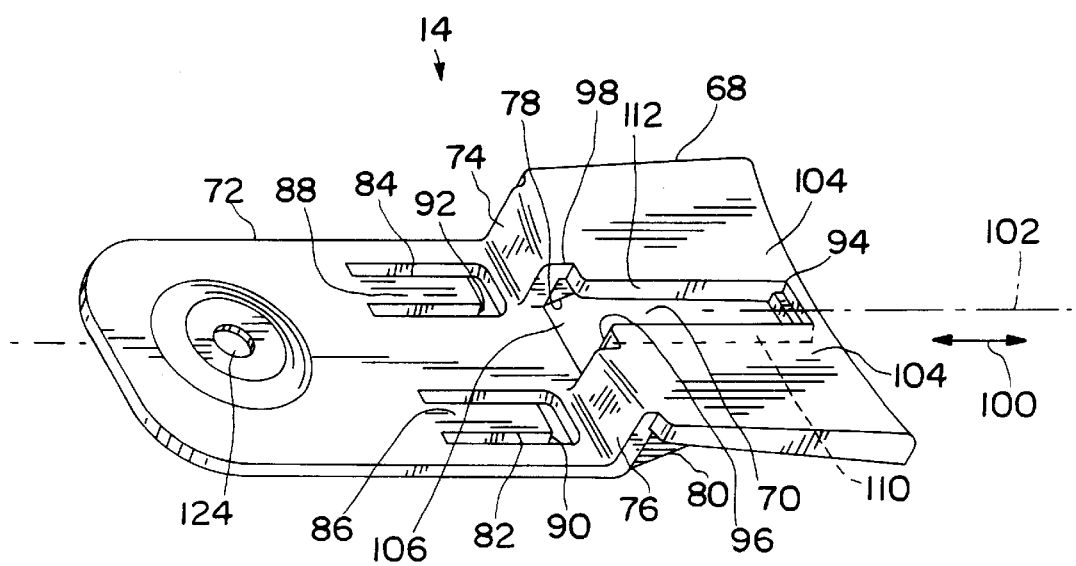
FIG. 3 is a perspective view of one embodiment of a mounting bracket of the present invention.

In the embodiment of FIGS. 1 and 3, the keyway 70 of the mounting bracket 14 includes an elongated opening 94 which comprises a first wall 96 and an opposite second wall 98. Walls 96 and 98 are elongated and extend in the direction 100 of a longitudinal axis 102 of the first portion 68 and the second portion 72. Axis 102 extends through the end opening 106 of the keyway 70 of the mounting bracket 14. In the embodiment of FIGS. 1 and 3, the first portion 68 includes a contoured surface 104 which is concave relative to axis 102.

The assembly of the lamp housing 12 and mounting bracket 14 will now be described with reference to FIGS. 1 and 4. The mounting bracket 14 may be attached to the lamp housing 12 by first moving the first portion 68 of the mounting bracket in the direction 46 of axis 24 towards the front of the lamp housing 14 and inserting the end 108 of the key 20 into the end opening 106 of the keyway 70. By continuing to slide the first portion 68 of the mounting bracket 14 in the direction 46 towards the front of the lamp housing 12, respective edges 110, 112 of walls 96, 98 of the mounting bracket will engage and slide along respective legs of the key 20, the wall 96 being adjacent the legs 52,56 and the wall 98 being adjacent the legs 54, 58. Continued sliding of the first portion 68 of the mounting bracket 14 in the direction 46 of axis 24 towards the front of the lamp housing 12 will cause the lug engaging surfaces 86 88 of the respective first flexible tongue 82 and the second flexible tongue 84 to be cammed by respective first camming surface 30 and second camming surface 32 of the locking lugs 26, 28 in a tongue camming mode. Such camming of the first and second flexible tongues 82, 84 will cause the tongues to flex radially away from longitudinal axis 24. Sliding of the first portion 68 of the mounting bracket 14 in the camming mode is continued until the lug engaging surfaces 90, 92 of respective first and second flexible tongues 82, 84 clear respective locking surfaces 34, 36 of the locking lugs 26, 28 in a tongue locking mode. In particular, in the tongue locking mode, the first and second flexible tongues 82, 84 will flex back towards longitudinal axis 24 to their normal non-flexed position, the lug engaging surfaces 90, 92 engaging respective locking surfaces 34, 36. When in the tongue locking mode, the mounting bracket 14 will be held in place in relation to the cup-shaped body 16 and prevented from further movement in the direction 46 of the horizontal axis 24 by (a) the engagement of the lug engaging surfaces 90, 92 with respective locking surfaces 34, 36 and (b) the engagement of stepped portions 74, 76 with the front edge 22. The mounting bracket 14 may be removed from the cup-shaped body 16 by flexing the second portion 72 toward axis 24 which causes flexible tongues 82, 84 to flex away from axis 24, and at the same time sliding the second portion 68 of the mounting bracket 14 in the direction 46 away from the front of the lamp housing.

Figure 4:
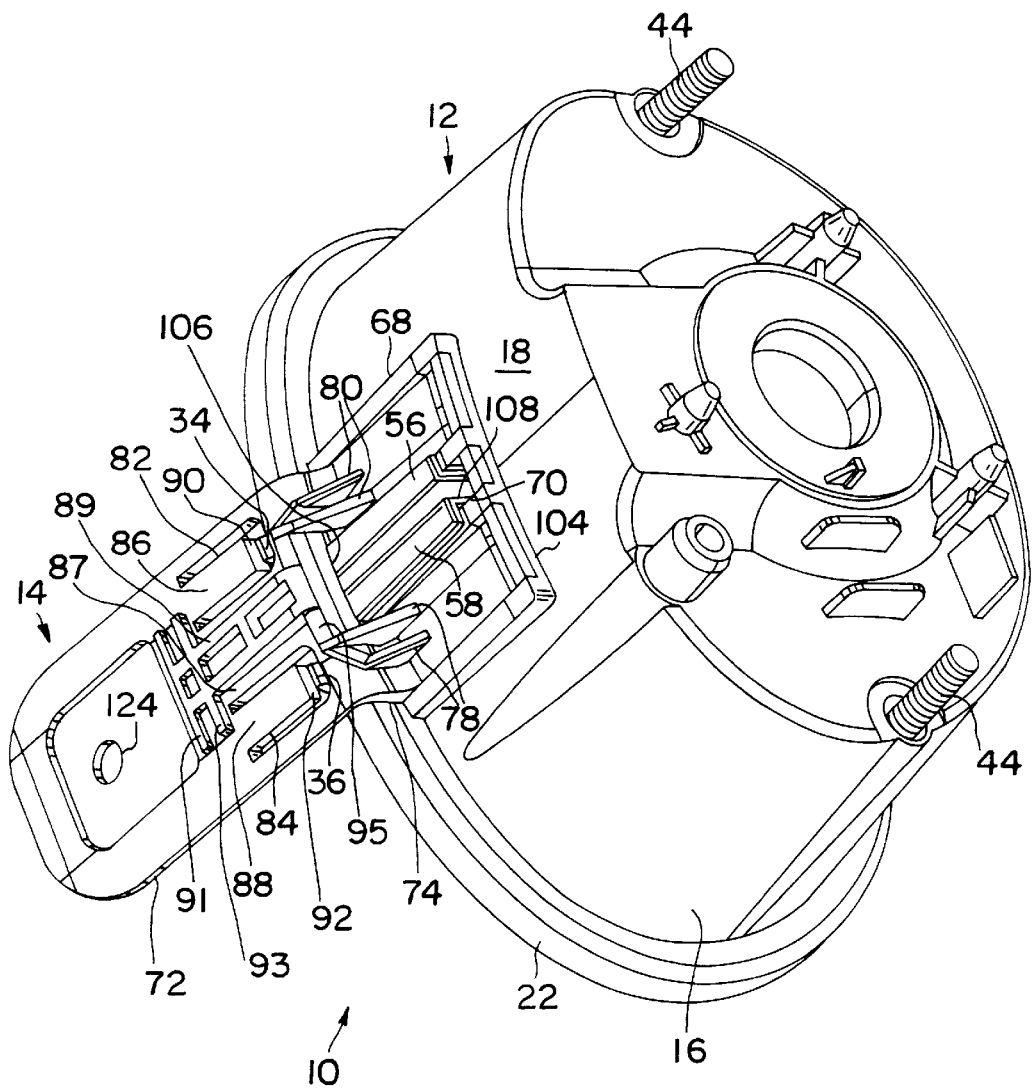
FIG. 4 is a perspective view of the lamp housing assembly depicted in FIG. 1 but fully assembled.

In the embodiment of FIGS. 1, 3 and 4, the walls 96 and 98 include respective wedge-shaped surfaces 110, 112 which are tapered in the direction 100 of the longitudinal axis 102 towards the second portion 72 of the mounting bracket 14. Walls 96 and 98 are thereby constructed and arranged to mate with respective wedge-shaped channels 64, 66 of the rails 48, 50 of the key 20 of the lamp housing 12 in the tongue locking mode. For example, when in the tongue locking mode, the tapered end of the surface 110 will extend into and mate with the tapered end of the wedge-shaped channel 64. Similarly, the tapered end of the surface 112 will extend into and mate with the tapered end of the wedge-shaped channel 66. The lamp housing 12 and mounting bracket 14 fully coupled together in this manner provide the lamp housing assembly 10 of the present invention as illustrated in FIG. 4. In such assembled embodiment, the contoured surface 104 of the first portion 68 of the mounting bracket 14 engages and substantially conforms to the surface 18 of the lamp housing 12, and the second portion 72 extends beyond the cup-shaped body 16.

Figure 5:
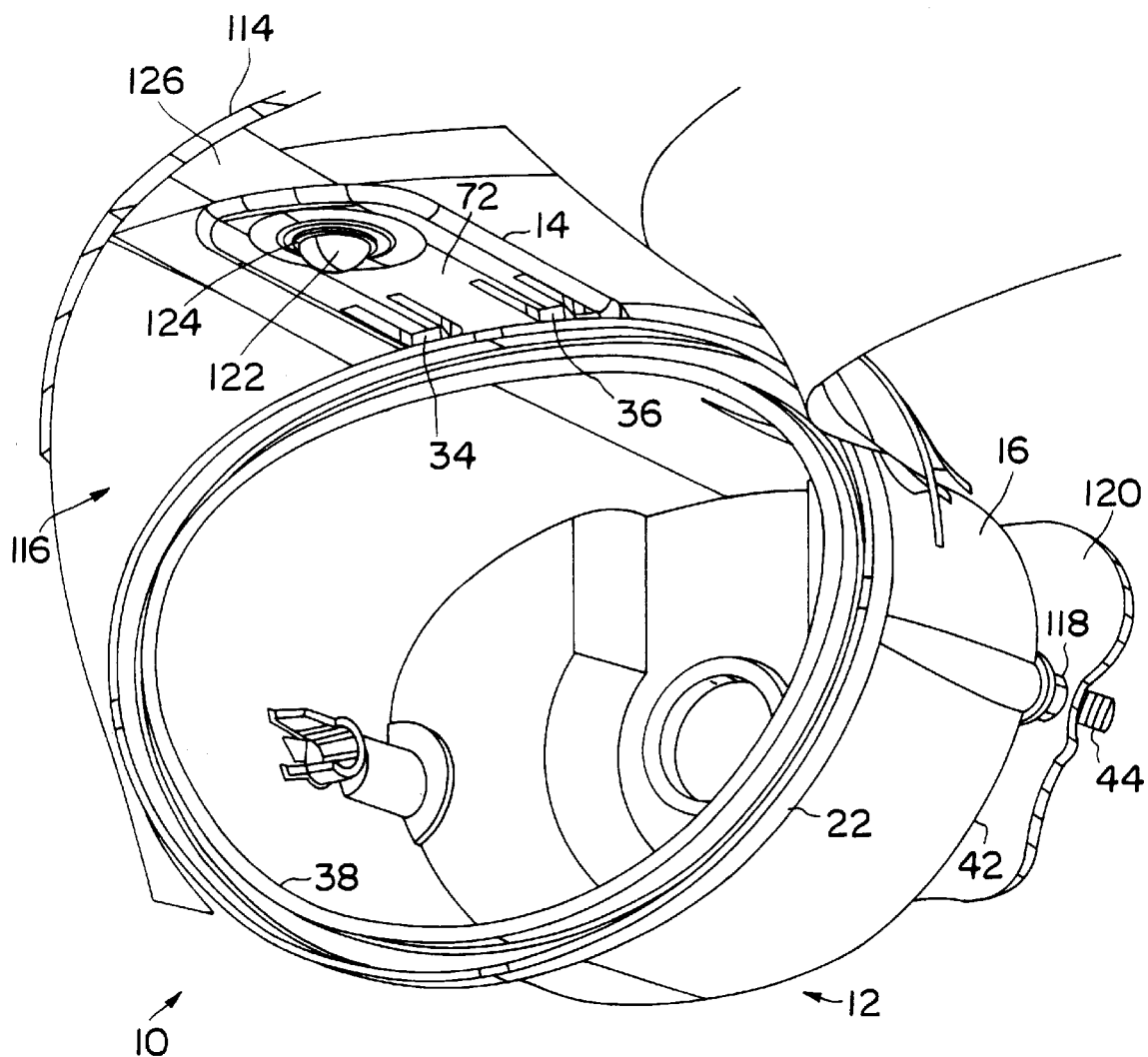
FIG. 5 is a perspective view of the lamp housing assembly depicted in FIG. 4 mounted to a motor vehicle.

FIG. 5 illustrates the lamp housing assembly 10 mounted to a motor vehicle 114. Such lamp housing assembly 10 is particularly useful in a vehicle in which rear access to the elongated fasteners 44 is very difficult, if at all possible. In such applications, it is very difficult or impossible to fasten nuts to such elongated fasteners 44 to hold the lamp housing assembly 10 in place. In such applications, the lamp housing assembly 10 of the present invention may be positioned in the conventional motor vehicle facia hole 116 with the elongated fasteners 44 (only one fastener 44 can be seen in FIG. 5) penetrating conventional stud holes 118 which extend through the back side 120 of the facia. No nuts are fastened to the elongated fasteners 44 since there is no access. The mounting bracket 14 serves to hold the lamp housing 12 in place. In particular, a screw 122 extends through an aperture 124 in the second portion 72 of the mounting bracket 14 and into a surface 126 of the facia. The extension of the second portion 72 beyond the cup-shaped body 16 facilitates such attachment. The lamp housing 12 may be constructed and arranged to fit tightly within the facia so that the facia abuts the sides of the lamp housing to prevent side sway thereof. The protrusion of the elongated fasteners 44 into respective stud holes 118 adds further stability to the lamp housing 12 vis-a-vis the facia, the elongated fasteners serving to hold the bulk of the weight of the lamp housing 12 and to properly locate the lamp housing relative to the facia. The lamp housing assembly 10 may be readily removed from the facia by merely unfastening the screw 122 and pulling the lamp housing assembly forward. In those embodiments wherein nuts can be fastened to the elongated fasteners 44 to hold the lamp housing 12 against the back side 120 of the facia, the same lamp housing 12 may be used but with the mounting bracket 14 dispensed with.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A lamp housing assembly comprising: a cup-shaped body having an upper surface; a key formed on said upper surface; and a mounting bracket, said mounting bracket including a first portion having a keyway engaged with said key and a second portion extending beyond said body and constructed and arranged to provide a structural mount and wherein said upper surface has a front edge having thereon at least one locking lug.

2. The lamp housing assembly of claim 1, wherein said mounting bracket includes at least one flexible tongue formed for engagement with said locking lug.

3. The lamp housing assembly of claim 1, wherein said key comprises a first rail and a second rail spaced from said first rail.

4. The lamp housing assembly of claim 3, wherein said first rail includes a first leg extending from said upper surface and a second leg extending from a distal edge of said first leg, and said second rail includes a third leg extending from said upper surface and a fourth leg extending from a distal edge of said third leg, said first leg being spaced from said third leg, and said second leg and said fourth leg extending away from each other, said keyway having an elongated opening which comprises a first wall adjacent said first leg and an opposite second wall adjacent said third leg, said first wall and said opposite second wall being slidable in relation to said first leg and said third leg and in the direction of a longitudinal axis of said body.

5. The lamp housing assembly of claim 4 wherein said upper surface has a front edge having thereon a first locking lug and a second locking lug spaced from said first locking lug, and further wherein said second portion includes a first flexible tongue constructed and arranged for engagement with said first locking lug and a second flexible tongue constructed and arranged for engagement with said second locking lug.

6. The lamp housing assembly of claim 5 wherein said first locking lug includes a first camming surface and a first locking surface, said first camming surface extending towards said first locking surface, and wherein said second locking lug includes a second camming surface and a second locking surface, said second camming surface extending towards said second locking surface, and further wherein said first flexible tongue and said second flexible tongue each comprise a respective first lug engaging surface which is cammed by a respective first camming surface and second camming surface in a tongue camming mode, and a respective second lug engaging surface which engages a respective first locking surface and second locking surface in a tongue locking mode.

7. The lamp housing assembly of claim 6 wherein said first leg, said second leg and said upper surface are constructed and arranged to form a first wedge-shaped channel which is tapered in said direction towards said front edge, and further wherein said third leg, said fourth leg and said upper surface are constructed and arranged to form a second wedge-shaped channel which is tapered in said direction towards said front edge, said first wall and said second wall being constructed and arranged to mate with said first wedge-shaped channel and said second wedge-shaped channel in said tongue-locking mode.

8. The lamp housing assembly of claim 1, wherein said body includes a lens opening and a rear surface, said upper surface extending between said lens opening and said rear surface, and further including at least one elongated fastener extending from said rear surface (a) in the direction of a longitudinal axis of said body and (b) away from said lens opening.

9. The lamp housing assembly of claim 7, wherein said body includes a lens opening and a rear surface, said upper surface extending between said lens opening and said rear surface, and further including at least one elongated fastener extending from said rear surface (a) in the direction of said longitudinal axis of said body and (b) away from said lens opening.

10. The lamp housing assembly of claim 1, wherein said cup-shaped body is substantially ellipsoidal.

11. The lamp housing assembly of claim 9, wherein said cup-shaped body is substantially ellipsoidal.

12. The lamp housing assembly of claim 10, wherein said first portion includes a contoured surface which engages, and is constructed and arranged to substantially conform to, said upper surface.

13. The lamp housing assembly of claim 11, wherein said first portion includes a contoured surface which engages, and is constructed and arranged to substantially conform to, said upper surface.

14. A lamp housing comprising a cup-shaped body having a first surface and a key formed on said first surface, said first surface has a front edge having thereon at least one locking lug, said key comprises a first rail and a second rail spaced from said first rail, wherein said first rail includes a first leg extending from said first surface and a second leg extending from a distal edge of said first leg, and said second rail includes a third leg extending from said first surface and a fourth leg extending from a distal edge of said third leg, said first leg being spaced from said third leg, and said second leg and said fourth leg extending away from each other, and wherein said first surface has a front edge having thereon a first locking lug and a second locking lug spaced from said first locking lug.

15. The lamp housing of claim 14 wherein said first locking lug includes a first camming surface and a first locking surface, said first camming surface extending towards said first locking surface, and wherein said second locking lug includes a second camming surface and a second locking surface, said second camming surface extending towards said second locking surface.

16. The lamp housing of claim 15 wherein said first leg, said second leg and said first surface are constructed and arranged to form a first wedge-shaped channel which is tapered in the direction of a longitudinal axis of said body towards said front edge, and further wherein said third leg, said fourth leg and said first surface are constructed and arranged to form a second wedge-shaped channel which is tapered in said direction towards said front edge.

17. The lamp housing of claim 4, wherein said body further includes a lens opening and a second surface, and further including at least one elongated fastener extending from said second surface (a) in the direction of a longitudinal axis of said body and (b) away from said lens opening.

18. The lamp housing of claim 16, wherein said body further includes a lens opening and a second surface, and further including at least one elongated fastener extending from said second surface (a) in the direction of said longitudinal axis of said body and (b) away from said lens opening.

19. The lamp housing of claim 4 wherein said cup-shaped body is substantially ellipsoidal.

20. The lamp housing of claim 18 wherein said cup-shaped body is substantially ellipsoidal.

21. A mounting bracket comprising a first portion having a keyway and a second portion constructed and arranged to provide a structural mount, further including at least one flexible tongue, wherein said keyway includes an elongated opening which comprises a first wall and an opposite second wall, said elongated opening, said first wall and said elongated second wall extending in a direction of a longitudinal axis of said first portion, and wherein said second portion includes a first flexible tongue and a second flexible tongue spaced from said first flexible tongue, said first flexible tongue and said second flexible tongue extending (a) in said direction and (b) towards said first portion.

22. The mounting bracket of claim 21, wherein said first wall and said second wall each includes a respective wedge-shaped surface which is tapered in said direction towards said second portion.

23. The mounting bracket of claim 22, wherein said first portion includes a contoured surface which is concave away from said longitudinal axis.

* * * * *